United States Patent
Su et al.

(10) Patent No.: US 10,553,873 B2
(45) Date of Patent: Feb. 4, 2020

(54) GRAPHITIC CARBON-BASED CATHODE FOR ALUMINUM SECONDARY BATTERY AND MANUFACTURING METHOD

(71) Applicant: Nanotek Instruments, Inc., Dayton, OH (US)

(72) Inventors: Yu-Sheng Su, Dayton, OH (US); Aruna Zhamu, Springboro, OH (US); Hui He, Dayton, OH (US); Baofei Pan, Dayton, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 205 days.

(21) Appl. No.: 15/454,053

(22) Filed: Mar. 9, 2017

(65) Prior Publication Data
US 2018/0261848 A1    Sep. 13, 2018

(51) Int. Cl.
*H01M 10/054* (2010.01)
*H01M 4/62* (2006.01)
*H01M 4/587* (2010.01)
*H01M 4/38* (2006.01)
*H01M 10/056* (2010.01)

(52) U.S. Cl.
CPC .............. *H01M 4/628* (2013.01); *H01M 4/38* (2013.01); *H01M 4/587* (2013.01); *H01M 10/054* (2013.01); *H01M 10/056* (2013.01); *H01M 2300/0045* (2013.01)

(58) Field of Classification Search
None
See application file for complete search history.

(56) References Cited

U.S. PATENT DOCUMENTS

| 2,798,878 A | 7/1957 | Hummers | |
| 5,874,166 A * | 2/1999 | Chu | H01M 4/587 423/447.2 |
| 2001/0028979 A1 | 10/2001 | Takami | |
| 2005/0271574 A1 | 12/2005 | Jang | |

(Continued)

OTHER PUBLICATIONS

Yoshio et al., Effect of Carbon Coating on Electrochemical Performance of Treated Natural Graphite as Lithium-Ion Battery Anode Material, Journal of The Electrochemical Society, 147 (4) 1245-1250 (2000) (Year: 2000).*

(Continued)

*Primary Examiner* — Lucas J. O'Donnell (57) ABSTRACT

Provided is aluminum secondary battery comprising an anode, a cathode, a porous separator electronically separating the anode and the cathode, and an electrolyte in ionic contact with the anode and the cathode to support reversible deposition and dissolution of aluminum at the anode, wherein the anode contains aluminum metal or an aluminum metal alloy as an anode active material and the cathode comprises a layer of graphitic carbon particles or fibers, preferably selected from meso-phase carbon particles, meso carbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof.

24 Claims, 5 Drawing Sheets

(56) References Cited

U.S. PATENT DOCUMENTS

| | | | |
|---|---|---|---|
| 2011/0165466 A1* | 7/2011 | Zhamu | B82Y 30/00 |
| | | | 429/231.8 |
| 2012/0082904 A1 | 4/2012 | Brown et al. | |
| 2015/0147661 A1 | 5/2015 | Iarochenko | |
| 2015/0249261 A1* | 9/2015 | Dai | H01M 10/054 |
| | | | 429/336 |

OTHER PUBLICATIONS

PCT/US18/20428—International Search Report and Written Opinion dated May 11, 2018, 9 pages.
Jayaprakash, N., Das, S. K. & Archer, L. A. "The rechargeable aluminum-ion battery," Chem. Commun. 47, 12610-12612 (2011).
Rani, J. V., Kanakaiah, V., Dadmal, T., Rao, M. S. & Bhavanarushi, S. "Fluorinated natural graphite cathode for rechargeable ionic liquid based aluminum-ion battery," J. Electrochem. Soc. 160, A1781-A1784 (2013).
Lin MC, Gong M, Lu B, Wu Y, Wang DY, Guan M, Angell M, Chen C, Yang J, Hwang BJ, Dai H., "An ultrafast rechargeable aluminum-ion battery," Nature. Apr. 16, 2015;520 (7547):325-8.

* cited by examiner

GRAPHITIC CARBON-BASED CATHODE FOR ALUMINUM SECONDARY BATTERY AND MANUFACTURING METHOD

FIELD OF THE INVENTION

The present invention relates generally to the field of rechargeable aluminum battery and, more particularly, to a high-rate capable cathode layer containing graphitic carbon and a method of manufacturing this cathode layer and the aluminum battery.

BACKGROUND OF THE INVENTION

Historically, the lithium-ion battery was evolved from the rechargeable "lithium metal battery" that uses lithium (Li) metal as the anode and a Li intercalation compound (e.g. $MoS_2$) as the cathode. Li metal is an ideal anode material due to its light weight (the lightest metal), high electronegativity (~3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was later implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power, and necessity to use pre-lithiated cathodes (e.g. lithium cobalt oxide, as opposed to cobalt oxide), thereby limiting the choice of available cathode materials. Further, these commonly used cathode active materials have a relatively low lithium diffusion coefficient (typically $D \sim 10^{-16}$-$10^{-11}$ $cm^2/sec$). These factors have contributed to one major shortcoming of today's Li-ion batteries—a moderate energy density (typically 150-220 $Wh/kg_{cell}$) but extremely low power density (typically <0.5 kW/kg).

Supercapacitors are being considered for electric vehicle (EV), renewable energy storage, and modern grid applications. The supercapacitors typically operate on using porous electrodes having large surface areas for the formation of diffuse double layer charges. This electric double layer capacitance (EDLC) is created naturally at the solid-electrolyte interface when voltage is imposed. This implies that the specific capacitance of an EDLC-type supercapacitor is directly proportional to the specific surface area of the electrode material, e.g. activated carbon. This surface area must be accessible by the electrolyte and the resulting interfacial zones must be sufficiently large to accommodate the EDLC charges.

This EDLC mechanism is based on ion adsorption on surfaces of an electrode. The required ions are pre-existing in a liquid electrolyte and do not come from the opposite electrode. In other words, the required ions to be deposited on the surface of a negative electrode (anode) active material (e.g., activated carbon particles) do not come from the positive electrode (cathode) side, and the required ions to be deposited on the surface of a cathode active material do not come from the anode side. When a supercapacitor is recharged, local positive ions are deposited close to a surface of a negative electrode with their matting negative ions staying close side by side (typically via local molecular or ionic polarization of charges). At the other electrode, negative ions are deposited close to a surface of this positive electrode with the matting positive ions staying close side by side. Again, there is no exchange of ions between an anode active material and a cathode active material.

In some supercapacitors, the stored energy is further augmented by pseudo-capacitance effects due to some local electrochemical reactions (e.g., redox). In such a pseudo-capacitor, the ions involved in a redox pair also pre-exist in the same electrode. Again, there is no exchange of ions between the anode and the cathode.

Since the formation of EDLC does not involve a chemical reaction or an exchange of ions between the two opposite electrodes, the charge or discharge process of an EDLC supercapacitor can be very fast, typically in seconds, resulting in a very high power density (typically 2-8 kW/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 20-40 Wh/Kg for the lead acid battery and 50-100 Wh/kg for the NiMH battery). Modern lithium-ion batteries possess a much higher energy density, typically in the range of 150-220 Wh/kg, based on the cell weight.

Secondary batteries based on various charge-discharge principles other than lithium ions have been proposed. Among them, some attention has been paid to aluminum secondary batteries based on the deposition-dissolution reaction of aluminum (Al) at the anode. Aluminum has a high ionization tendency and is capable of three-electron redox reactions, which can potentially enable an aluminum battery to deliver a high capacity and high energy density.

The abundance, low cost, and low flammability of Al, and its ability to undergo three-electron redox imply that rechargeable Al-based batteries could in principle offer cost-effectiveness, high capacity and safety. However, the rechargeable Al batteries developed over the past 30 years have failed to make it to the marketplace. This has been likely due to problems such as cathode material disintegration, low cell discharge voltage (e.g. 0.55V), a capacitive behavior without a discharge voltage plateau (e.g. 1.1-0.2 V), and short cycle life (typically <100 cycles) with rapid capacity decay (by 26-85% over 100 cycles), low cathode specific capacity, and low cell-level energy density (<50 Wh/kg).

For instance, Jayaprakash reports an aluminum secondary battery that shows a discharge curve having a plateau at 0.55 V [Jayaprakash, N., Das, S. K. & Archer, L. A. "The rechargeable aluminum-ion battery," Chem. Commun. 47, 12610-12612 (2011)]. A rechargeable battery having an output voltage lower than 1.0 volt has a limited scope of application. As a point of reference, alkaline battery has an output voltage of 1.5 volts and a lithium-ion battery has a typical cell voltage of 3.2-3.8 volts. Furthermore, even with an initial cathode specific capacity as high as 305 mAh/g, the energy storage capability of the cathode is approximately 0.55 V×305 mAh/g=167.75 Wh/kg based on the cathode active material weight alone (not based on the total cell weight). Thus, the cell-level specific energy (or gravimetric energy density) of this Al—$V_2O_5$ cell is approximately 167.75/3.6=46.6 Wh/kg (based on the total cell weight).

(As a point of reference, a lithium-ion battery having a lithium iron phosphate (LFP) as the cathode active material (having a theoretical specific capacity of 170 mAh/g) delivers an output voltage of 3.2 volts and an energy storage capability of 3.2 V×170 mAh/g=544 Wh/kg (based on the LFP weight only). This cell is known to deliver a cell-level energy density of approximately 150 Wh/kg. Thus, there is a reduction factor of 544/150=3.6 to convert a cathode active material weight-based energy density value to a total cell weight-based energy density value in this battery system.)

As another example, Rani reports an aluminum secondary battery using a lightly fluorinated natural graphite as the cathode active material having an output voltage varying from 0.2 volts to 1.1 volts [Rani, J. V., Kanakaiah, V., Dadmal, T., Rao, M. S. & Bhavanarushi, S. "Fluorinated natural graphite cathode for rechargeable ionic liquid based aluminum-ion battery," J. Electrochem. Soc. 160, A1781-A1784 (2013)]. With an average voltage of approximately 0.65 volts and a discharge capacity of 225 mAh/g, the cell delivers an energy storage capability of 0.65×225=146.25 Wh/kg (of the cathode active material weight only) or cell-level specific energy of 146.25/3.6=40.6 Wh/kg (based on the total cell weight).

As yet another example, Lin, et al. reports an aluminum-graphite foam cell that exhibits a plateau voltage near 2 volts and an output voltage of 70 mAh/g [Lin M C, Gong M, Lu B, Wu Y, Wang D Y, Guan M, Angell M, Chen C, Yang J, Hwang B J, Dai H., "An ultrafast rechargeable aluminum-ion battery," Nature. 2015 Apr. 16; 520 (7547):325-8]. The cell-level specific energy is expected to be approximately 70×2.0/3.6=38.9 Wh/kg. As a matter of fact, Lin, et al. has confirmed that the specific energy of their cell is approximately 40 Wh/kg.

Clearly, an urgent need exists for new aluminum secondary battery cathode materials that provide proper discharge voltage profiles (having a high average voltage and/or a high plateau voltage during discharge), high specific capacity at both high and low charge/discharge rates (not just at a low rate), and long cycle-life. Hopefully, the resulting aluminum battery can deliver some positive attributes of a supercapacitor (e.g. long cycle life and high power density) and some positive features of a lithium-ion battery (e.g. moderate energy density). These are the main objectives of the instant invention.

SUMMARY OF THE INVENTION

The invention provides a cathode or positive electrode layer for an aluminum secondary battery (rechargeable aluminum battery or aluminum-ion battery) and an aluminum secondary battery containing such a cathode layer.

In certain embodiments, the invention provides an aluminum secondary battery comprising an anode, a cathode, a porous separator electronically separating the anode and the cathode, and an electrolyte in ionic contact with the anode and the cathode to support reversible deposition and dissolution of aluminum at the anode, wherein the anode contains aluminum metal or an aluminum metal alloy as an anode active material and the cathode comprises a cathode active layer of graphitic carbon particles or fibers as a cathode active material that intercalates/de-intercalates aluminum ions or aluminum-containing ions. The graphitic carbon is preferably selected from meso-phase carbon particles, meso carbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof.

We have observed that some graphitic carbon materials, such as meso-phase carbon particles, meso carbon micro-beads (MCMB), coke particles (e.g. needle coke), soft carbon particles, hard carbon particles, carbon nano-fibers, carbon fibers, graphite nano-fibers, and graphite fibers, have a thin skin layer of hard carbon naturally formed in their surfaces when these synthetic graphitic carbon particles or fibers are produced. We have surprisingly observed that it is highly beneficial to subject these particles or fibers to a surface treatment (e.g. surface chemical etching, surface plasma cleaning, etc.) to remove some or all of the hard carbon skin on their exterior surface.

In certain preferred embodiments, the graphitic carbon (e.g. meso-phase carbon particles, meso carbon micro-beads (MCMB), coke particles or needles, soft carbon particles, hard carbon particles, amorphous graphite, multi-walled carbon nanotubes, and carbon nano-fibers), with or without the above-stated surface treatment, is coated with a protective layer that is permeable to aluminum ions or other ions dissolved in the electrolyte and that prevents or reduces exfoliation of graphitic planes in the graphitic carbon particles or fibers. We have surprisingly observed that repeated intercalation/de-intercalation of $Al^{+3}$ and other ions into and out of the graphitic crystallites or domains could cause expansion and exfoliation of graphene planes (hexagonal carbon atom planes). This effect, although initially increases the charge storage capacity of the cathode material, later causes severe graphene plane exfoliation to the extent that the cathode layer structural integrity is compromised and the charge storage capability rapidly decays. By depositing a thin layer of protective material on surfaces of the graphitic carbon particles or fibers, one could significantly improve the structural integrity and cycle stability of the cathode layer.

In some preferred embodiments, the graphitic carbon is a filament selected from needle coke, carbon nano-fiber, carbon fiber, graphite nano-fiber, graphite fiber, multi-walled carbon nanotube, or a combination thereof and said graphitic fiber has a length shorter than 10 μm (preferably from 10 nm to 10 μm and more preferably shorter than 1 μm). Preferably both ends of the filament are open and the filament is short to enable easier entry of ions and a short travel length for these ions.

The aluminum secondary battery may further comprise an anode current collector supporting the aluminum metal or aluminum metal alloy or further comprise a cathode current collector supporting the layer of graphitic carbon. Preferably, the anode current collector contains an integrated nano-structure of electrically conductive nanometer-scaled filaments that are interconnected to form a porous network of electron-conducting paths comprising interconnected pores, wherein the filaments have a transverse dimension less than 500 nm. The filaments may comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof.

In the aluminum secondary battery, the electrolyte may be selected from an aqueous electrolyte, organic electrolyte, molten salt electrolyte, ionic liquid electrolyte, or a combination thereof. In certain preferred embodiments, the electrolyte contains $AlF_3$, $AlCl_3$, $AlBr_3$, $AlI_3$, $AlF_xCl_{(3-x)}$, $AlBr_xCl_{(3-x)}$, $AlI_xCl_{(3-x)}$, or a combination thereof, wherein x is from 0.01 to 2.0.

The electrolyte may contain an ionic liquid that contains an aluminum salt mixed with an organic chloride selected from n-butyl-pyridinium-chloride (BuPyCl), 1-methyl-3-ethylimidazolium-chloride (MEICl), 2-dimethyl-3-propylimidazolium-chloride, 1,4-dimethyl-1,2,4-triazolium chloride (DMTC), or a mixture thereof.

Preferably, the electrolyte also supports reversible intercalation and de-intercalation of ions at the cathode, wherein the ions include cations, anions, or both.

In certain embodiments, the layer of graphitic carbon fibers may operate as a cathode current collector to collect electrons during a discharge of the aluminum secondary battery and wherein the battery contains no separate or additional cathode current collector.

In some embodiments, the layer of graphitic carbon particles or fibers further comprises an electrically conductive binder material which bonds thed graphitic carbon particles or fibers together to form a cathode electrode layer. The electrically conductive binder material may comprise coal tar pitch, petroleum pitch, meso-phase pitch, a conducting polymer, a polymeric carbon, or a derivative thereof.

The aluminum secondary battery typically has an average discharge voltage no less than 1.5 volt and a cathode specific capacity greater than 100 mAh/g based on a total cathode active layer weight. More typically, the aluminum secondary battery has an average discharge voltage no less than 1.5 volt and a cathode specific capacity greater than 150 mAh/g based on a total cathode active layer weight. Most of the invented aluminum secondary batteries have an average discharge voltage no less than 2.0 volts and a cathode specific capacity greater than 120 mAh/g based on a total cathode active layer weight. In some cases, the battery has an average discharge voltage no less than 2.0 volts and a cathode specific capacity greater than 150 mAh/g based on a total cathode active layer weight.

The present invention also provides a method of manufacturing an aluminum secondary battery, comprising: (a) providing an anode containing aluminum metal or an aluminum alloy; (b) providing a cathode containing graphitic carbon particles or fibers; and (c) providing a porous separator electronically separating the anode and the cathode and an electrolyte capable of supporting reversible deposition and dissolution of aluminum at the anode and reversible adsorption/desorption and/or intercalation/de-intercalation of ions at the cathode; wherein the graphitic carbon particles or fibers are selected from meso-phase carbon particles, meso carbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof.

In some embodiments, the method further includes providing a porous network of electrically conductive nano-filaments to support the aluminum metal or aluminum alloy at the anode.

The electrolyte may contain an aqueous electrolyte, an organic electrolyte, a molten salt electrolyte, an ionic liquid, or a combination thereof.

The step of providing a cathode may contain subjecting the graphitic carbon particles or fibers to a surface etching treatment to remove an amount of surface hard carbon from the graphitic carbon particles or fibers.

In the method, the graphitic carbon (e.g. meso-phase carbon particles, meso carbon micro-beads (MCMB), coke particles or needles, soft carbon particles, hard carbon particles, amorphous graphite, multi-walled carbon nanotubes, and carbon nano-fibers), with or without the above-stated surface treatment, may be coated with a protective layer that is permeable to aluminum ions or ions dissolved in the electrolyte and that prevents or reduces exfoliation of graphitic planes in the graphitic carbon particles or fibers.

The method may include applying a binder material which bonds the graphitic carbon particles or fibers together to form a cathode electrode layer. The binder material may be an electrically conductive material selected from coal tar pitch, petroleum pitch, meso-phase pitch, a conducting polymer, a polymeric carbon, or a derivative thereof.

DESCRIPTION OF THE PREFERRED EMBODIMENTS

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm. Typically, natural graphite has essentially >95% of the mass being well-ordered graphite crystals with very little defect or amorphous zones. The degree of graphitization is typically >95%.

Artificial graphite materials, such as highly oriented pyrolytic graphite (HOPG), also contain constituent graphene planes, but they have an inter-graphene planar spacing, $d_{002}$, typically from 0.336 nm to 0.365 nm, as measured by X-ray diffraction. Both the natural graphite and artificial graphite have a physical density being typically >2.1 g/cm$^3$, more typically >2.2 g/cm$^3$, and most typically very close to 2.25 g/cm$^3$.

Many carbon or quasi-graphite materials (herein referred to as graphitic carbon) also contain graphite crystals (also referred to as graphite crystallites, domains, or crystal grains) that are each composed of stacked graphene planes. However, the structure typically has a high proportion of amorphous or defect zones. These include meso-carbon mocro-beads (MCMBs), meso-phase carbon, soft carbon, hard carbon, coke (e.g. needle coke), and carbon or graphite fibers (including vapor-grown carbon nano-fibers or graphite nano-fibers). The multi-walled carbon nanotubes (MW-CNT) does have very little defect or amorphous portion, but each CNT has a tubular structure. Hence, the multi-walled CNTs have a physical density of approximately 1.35 g/cm$^3$. Other types of graphitic carbon have a typical density lower than 2.1 g/cm$^3$, and more typically lower than 2.0 g/cm$^3$, further more typically <1.9 g/cm$^3$, and most typically <1.8 g/cm$^3$.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized. Both hard carbon and soft carbon contain graphite domains.

The invention provides an aluminum secondary battery comprising an anode, a cathode, a porous separator electronically separating the anode and the cathode, and an electrolyte in ionic contact with the anode and the cathode to support reversible deposition and dissolution of aluminum at the anode, wherein the anode contains aluminum metal or an aluminum metal alloy as an anode active material and the cathode comprises a layer of graphitic carbon particles or fibers (filaments), preferably selected from meso-phase carbon particles, meso carbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof.

We have observed that some graphitic carbon materials, such as meso-phase carbon particles, meso carbon micro-beads (MCMB), coke particles or needles, soft carbon particles, hard carbon particles, carbon nano-fibers, carbon fibers, graphite nano-fibers, and graphite fibers, have a thin skin layer of hard carbon naturally formed in their surfaces when these synthetic graphitic carbon particles or fibers are produced. We have surprisingly observed that it is highly beneficial to subject these particles or fibers to a surface treatment (e.g. surface chemical etching, surface plasma cleaning, etc.) to remove some or all of the hard carbon on their exterior surface.

In certain preferred embodiments, the graphitic carbon (e.g. meso-phase carbon particles, meso carbon micro-beads (MCMB), coke particles or needles, soft carbon particles, hard carbon particles, amorphous graphite, multi-walled carbon nanotubes, and carbon nano-fibers), with or without the above-stated surface treatment, may be coated with a protective layer that is permeable to aluminum ions or ions dissolved in the electrolyte and that prevents or reduces exfoliation of graphitic planes in the graphitic carbon particles or fibers. We have surprisingly observed that, upon repeated intercalation/de-intercalation of $Al^{+3}$ and other ions into and out of the graphitic crystallites or domains could cause expansion of interplanar spaces between graphene planes and exfoliation of graphene planes (hexagonal carbon atom planes). This effect, although can initially increase the charge storage capacity of the cathode material, later causes severe graphene plane exfoliation to the extent that the cathode layer structural integrity is compromised and the charge storage capability rapidly decays. By depositing a thin layer of protective material on surfaces of the graphitic carbon particles or fibers, one could significantly improve the structural integrity and cycle stability of the cathode layer.

This protective material may be selected from reduced graphene oxide (that wraps around the graphitic carbon particles), carbonized resin (or polymeric carbon), ion-conducting polymers (e.g. sulfonated polymers), and electrically conductive polymers. The polymeric carbon may be selected from a polymer of low carbon content (e.g. epoxy resin or polyethylene) or high carbon content (e.g. phenolic resin or polyacrylonitrile). The electrically conducting polymer may be selected from polyaniline, polypyrrole, polythiophene, polyfuran, a bi-cyclic polymer, derivatives thereof (e.g. sulfonated versions), or a combination thereof.

In some embodiments, the ion-conducting polymer is selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a combination thereof.

The sulfonated polymer may be selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends, and combinations thereof.

The configuration of an aluminum secondary battery is now discussed as follows:

An aluminum secondary battery includes a positive electrode (cathode), a negative electrode (anode), and an electrolyte including an aluminum salt and a solvent. The anode can be a thin foil or film of aluminum metal or aluminum metal alloy (e.g. left-hand side of FIG. 1(A)). The anode can be composed of particles, fibers, wires, tubes, or discs of Al metal or Al metal alloy that are packed and bonded together by a binder (preferably a conductive binder) to form an anode layer.

Figure 1A:
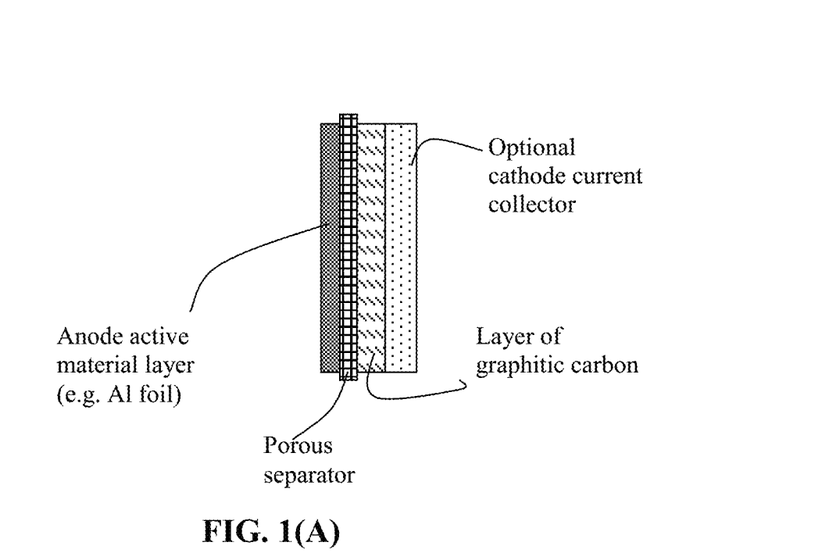
FIG. 1(A) Schematic of an aluminum secondary battery, wherein the anode layer is a thin Al coating or Al foil and the cathode active material layer contains a layer of graphitic carbon particles or fibers (filaments)
Figure 1B:
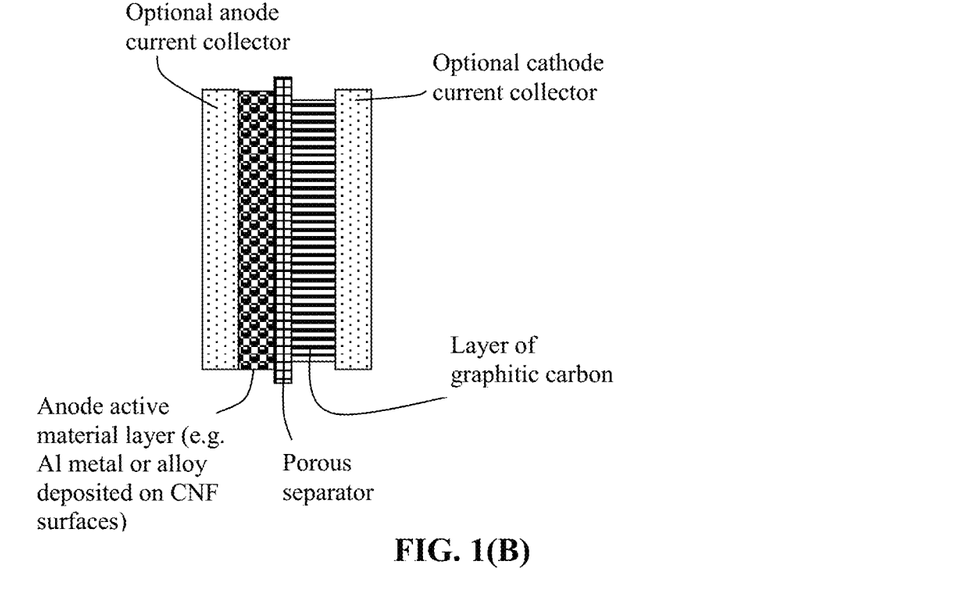
FIG. 1(B) schematic of an aluminum secondary battery cell having a cathode active material layer composed of graphitic carbon particles or fibers (filaments) and an anode composed of Al metal coating deposited on surfaces of a nano-structured network of conductive filaments.

A desirable anode layer structure is composed of a network of electron-conducting pathways (e.g. mat of graphene sheets, carbon nano-fibers, or carbon-nanotubes) and a thin layer of aluminum metal or alloy coating deposited on surfaces of this conductive network structure (e.g. left-hand side of FIG. 1(B)). Such an integrated nano-structure may be composed of electrically conductive nanometer-scaled filaments that are interconnected to form a porous network of electron-conducting paths comprising interconnected pores, wherein the filaments have a transverse dimension less than 500 nm. Such filaments may comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof. Such a nano-structured, porous supporting material for aluminum can significantly improve the aluminum deposition-dissolution kinetics, enabling high-rate capability of the resulting aluminum secondary cell.

Illustrated in FIG. 1(A) is a schematic of an aluminum secondary battery, wherein the anode layer is a thin Al coating or Al foil and the cathode active material layer contains a layer of graphitic carbon particles or fibers. Alternatively, FIG. 1(B) shows a schematic of an aluminum secondary battery cell wherein the anode layer is composed of a thin coating of aluminum metal or aluminum alloy supported on surfaces of a network of conductive filaments and the cathode active material layer contains a layer of graphitic carbon particles or fibers.

The composition of the electrolyte, which functions as an ion-transporting medium for charge-discharge reaction, has a great effect on battery performance. To put aluminum secondary batteries to practical use, it is necessary to allow aluminum deposition-dissolution reaction to proceed smoothly and sufficiently even at relatively low temperature (e.g., room temperature). In conventional aluminum secondary batteries, however, aluminum deposition-dissolution reaction can proceed smoothly and sufficiently only at relatively high temperature (e.g., 50° C. or higher), and the efficiency of the reaction is also low. The electrolyte for use in an aluminum secondary battery can include an aluminum salt, alkyl sulfone, and a solvent with a dielectric constant of 20 or less so that the electrolyte can operate at a lower temperature (e.g. room temperature) at which aluminum deposition-dissolution reaction proceeds.

Aqueous electrolytes that can be used in the aluminum secondary batteries include aluminum salts dissolved in water; for instance, $AlCl_3\cdot 6H_2O$, $CrCl_3\cdot 6H_2O$, and $Al(NO_3)_3$ in water. Alkaline solutions, such as KOH and NaOH in water, may also be used.

Organic electrolytes for use in aluminum secondary batteries include various electrolytes with g-butyrolactone (BLA) or acetonitrile (ACN) as solvent; e.g. $AlCl_3/KCl$ salts in BLA or $(C_2H_5)_4NClxH_2O$ (TEAC) in ACN. Also included are concentrated aluminum triflate-based electrolyte, a bath of aluminum chloride and lithium aluminum hydride dissolved in diethyl ether, and $LiAlH_4$ and $AlCl_3$ in tetrahydrofuran. For example, alkyl sulfone such as dimethylsulfone may be used, along with an organic solvent such as a cyclic or chain carbonate or a cyclic or chain ether can be used. In order to reduce polarization during discharge, an aluminum salt such as aluminum chloride and an organic halide such as trimethylphenylammonium chloride may be used together in the electrolyte. For this salt mixture, an organic solvent such as 1,2-dichloroethane may be used.

Another type of electrolyte capable of reversible aluminum electrochemistry is molten salt eutectics. These are typically composed of aluminum chloride, sodium chloride, potassium chloride and lithium chloride in some molar ratio. Useful molten salt electrolytes include $AlCl_3$—NaCl, $AlCl_3$—(LiCl—KCl), and $AlCl_3$—KCl—NaCl mixtures. Among these alkali chloroaluminate melts, binary NaCl—$AlCl_3$ and ternary NaCl—KCl—$AlCl_3$ systems are the most widely used molten salts for developing aluminum batteries. In these systems, the melts with molar ratio of $MCl/AlCl_3$ (where M is commonly Na and/or K) larger than unity are defined as basic, whereas those with molar ratio less than unity as acidic. In an acidic melt, $Al_2Cl_7$ is the major anion species. As the acidity ($AlCl_3$ content) of the melt decreases, $AlCl_4^-$ becomes the major species.

A special class of molten salt for use in an aluminum secondary battery is room temperature molten salts (ionic liquids). For instance, a useful ionic liquid electrolyte solution is aluminum chloride mixed in 1-ethyl-3-methylimidazolium chloride ($AlCl_3$:EMIC). Commercially available 1-ethyl-3-methylimidazolium chloride may be purified by recrystallization from ethyl acetate and acetonitrile. Aluminum chloride may be further purified by triple sublimation. The ionic liquid may be prepared by slowly mixing molar equivalent amounts of both salts. Further, $AlCl_3$ was then added to the equimolar mix until a concentration of 1M $AlCl_3$ was obtained. Desirably, this concentration corresponds to a molar ratio of 1.2:1, $AlCl_3$:EMIC.

Aluminum chloride ($AlCl_3$) also forms room temperature electrolytes with organic chlorides, such as n-butyl-pyridinium-chloride (BuPyCl), 1-methyl-3-ethylimidazolium-chloride (MEICl), and 2-dimethyl-3-propylimidazolium-chloride. The molten mixture of 1,4-dimethyl-1,2,4-triazolium chloride (DMTC) and $AlCl_3$ may also be used as the secondary battery electrolyte.

This invention is directed at the cathode active layer (positive electrode layer) containing a high-capacity cathode material for the aluminum secondary battery. The invention also provides such a battery based on an aqueous electrolyte, a non-aqueous electrolyte, a molten salt electrolyte, a polymer gel electrolyte (e.g. containing an aluminum salt, a liquid, and a polymer dissolved in the liquid), an ionic liquid electrolyte, or a combination thereof. The shape of an aluminum secondary battery can be cylindrical, square, button-like, etc. The present invention is not limited to any battery shape or configuration.

The following examples are used to illustrate some specific details about the best modes of practicing the instant invention and should not be construed as limiting the scope of the invention.

Example 1

Cathode Layer Containing Needle Coke

Commercially available needle coke (Jinzhou Petrochemical Co.) was used to prepare cathode active material layers. Both surface treated and non-treated needle coke powders were studied. A sample of surface-treated needle coke (needle-shape coke filaments) was prepared by immersing the filaments in concentrated sulfuric acid for 2 hours to remove the hard carbon skin. The rinsed and dried powder was then mixed with a PVDF binder in a solvent (NMP) to form a slurry, which was coated on a sheet of carbon paper (as a current collector) to form a cathode layer.

Example 2

Various Graphitic Carbon and Graphite Materials

Several cathode layers were prepared according to the same procedure as used in Example 1, but the starting graphite materials were powders of highly oriented pyrolytic graphite (HOPG), natural graphite powder, pitch-based graphite fiber, vapor-grown carbon nano-fiber (VG-CNF), and amorphous graphite, respectively.

Example 3

Preparation of Graphite Oxide Using a Modified Hummers' Method and Subsequent Wrapping of Amorphous Graphite with Graphene Oxide Sheets Graphite oxide was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately 4 hours at 35° C. It is important to caution that potassium permanganate should be gradually added to sulfuric acid in a well-controlled manner to avoid overheat and other safety issues. Upon completion of the reaction, the sample was then washed repeatedly with deionized water until the pH of the filtrate was approximately 5. The solution was ultrasonicated for 30 minutes to produce graphene oxide suspension.

Powder of amorphous graphite containing micro-crystallites was poured into the graphene oxide suspension to form a slurry. The slurry was spray-dried to form graphene oxide-wrapped amorphous graphite particles (protected particulates). We have observed that the cycle life of protected amorphous graphite particulates (defined as the number of charge/discharge cycles when a 20% reduction of capacity is reached) is significantly longer than that of the unprotected amorphous graphite particles (>3,000 cycles for protected particulates vs. <1,000 cycles for un-protected particles).

Example 4

Cathode Active Layer Containing Soft Carbon Particles

Particles of soft carbon were prepared from a liquid crystalline aromatic resin. The resin was ground with a mortar, and calcined at 900° C. for 2 h in a $N_2$ atmosphere to prepare the graphitizable carbon or soft carbon.

Example 5

Petroleum Pitch-Derived Hard Carbon Particles

A pitch sample (A-500 from Ashland Chemical Co.) was carbonized at 900° C. for 2 hours, followed by carbonization at 1,200° C. for 4 hours. A solution of KOH in water (5% concentration) was used to surface-treat the hard carbon particles for the purpose of removing the skin carbon layer of the pitch-based hard carbon particles.

Example 6

Meso-Phase Carbon

Optically anisotropic spherical carbon (average particle size: 25 μm, quinoline soluble: 5%) was prepared from coal-based meso-phase pitch by heat treating the pitch at 500° C. for 2 hours, carbonized at 900° C. for 2 hours and then partially graphitized at 2,500° C. for 1 hour.

Example 7

Multi-Walled Carbon Nanotubes (MW-CNTs) of Different Tube Lengths

Powder samples of MW-CNTs (5% by weight) were dispersed in water with a 0.5% by weight of a surfactant to form several suspensions. The suspensions were then ultra-sonicated for 30 minutes, 1 hour, and 3 hours, respectively. One of the samples (3 hours) was further ball-milled in a high-intensity mill for 5 hours. The resulting CNT samples have different average CNT lengths (43.5 μm, 3.9 μm, and 0.32 μm, respectively).

Example 8

Preparation and Testing of Various Aluminum Cells

The graphitic carbon powders prepared in Examples 1-7 were separately made into a cathode layer and incorporated into an aluminum secondary battery. Two types of Al anode were prepared. One was Al foil having a thickness from 16 μm to 300 μm. The other was Al thin coating deposited on surfaces of conductive nano-filaments (e.g. CNTs) or graphene sheets that form an integrated 3D network of electron-conducting pathways having pores and pore walls to accept Al or Al alloy. Either the Al foil itself or the integrated 3D nano-structure also serves as the anode current collector.

Cyclic voltammetry (CV) measurements were carried out using an Arbin electrochemical workstation at a typical scanning rate of 0.5-50 mV/s. In addition, the electrochemical performances of various cells were also evaluated by galvanostatic charge/discharge cycling at a current density from 50 mA/g to 10 A/g. For long-term cycling tests, multi-channel battery testers manufactured by LAND were used.

Figure 2:
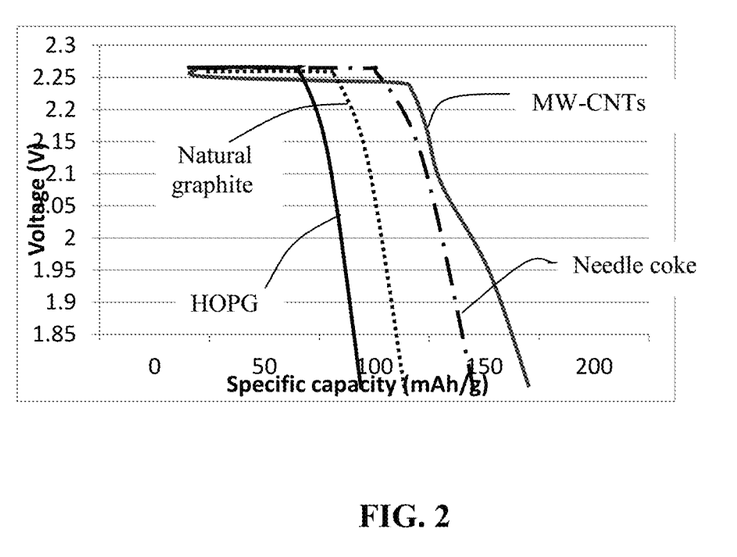
FIG. 2 The discharge curves of four Al foil anode-based cells: first one having a cathode layer of natural graphite particles (prior art); second one having a cathode layer of highly oriented pyrolytic graphite (prior art); third one having a cathode layer of needle coke; and fourth one having multi-walled CNTs.

FIG. 2 shows the discharge curves of four Al foil anode-based cells: first one having a cathode layer of natural graphite particles (prior art); second one having a cathode layer of highly oriented pyrolytic graphite, HOPG (prior art); third one having a cathode layer of needle coke; and fourth one having multi-walled CNTs. The electrolyte used was aluminum chloride mixed in 1-ethyl-3-methylimidazolium chloride ($AlCl_3$:EMIC molar ratio=3.5/1). These data indicate that the four battery cells all exhibit an initial plateau voltage, but the length of this plateau varied with different materials. The cathode layer containing MW-CNTs exhibits the longest plateau, followed by a slopping curve portion. The plateau is likely due to intercalation of $Al^{3+}$, $AlCl_4^-$, and/or $Al_2Cl_7^-$ ions into the interstitial spaces between graphene planes (graphene walls in CNTs). The slopping curve may be due to adsorption/desorption of ions on CNT surfaces. These are further explained below: In the discharge process, Al metal is oxidized and released from Al foil to form $Al^{3+}$ ions.

Under the influence of the electric field, $Al^{3+}$ ions move to the cathode side. Then, $Al^{3-}$ ions and aluminum chloride coordination anions $[Al_aCl_b]^-$ can simultaneously intercalate into the spaces between graphene planes, forming $Al_xCl_y$. The intercalated $Al_xCl_y$ and neighboring graphene layers (graphene planes) interact with each other by van der Waals' forces. During the charge process, the electrochemical reactions are reversed.

In the ionic liquid-based electrolyte, the existing coordination ions are $AlCl_4^-$ or $Al_2Cl_7^-$, and thus the intercalated coordination ion $[Al_aCl_b]^-$ might be $AlCl_4^-$ or $Al_2Cl_7^-$ or a mixture thereof. Based on the above assumption, the electrode reactions for both the anode and cathode may be described as follows:

In the charge process, $$Al^{3+} + 3e^- \rightarrow Al \text{ (anode)} \quad (1)$$

$$Al_xCl_y - e^- \rightarrow Al^{3+} + [Al_aCl_b]^- \text{ (cathode)} \quad (2)$$

At the anode, during battery charging, $Al_2Cl_7^-$ ions can react with electrons to form $AlCl_4^-$ anions and Al. At the cathode, desorption of $EMI^+$ ions from graphite surfaces may also occur.

In the discharge process, $$Al - 3e^- \rightarrow Al^{3+} \text{ (anode)} \quad (3)$$

$$Al^{3+} + [Al_aCl_b]^- + e^- \rightarrow Al_xCl_y \text{ (cathode)} \quad (4)$$

It appears that ions can "intercalate" into the inter-planar spaces at a reasonably high voltage (2.2 vs. $Al/Al^{3+}$). Both needle coke and CNTs enable ion intercalation at a relatively high voltage over a long plateau range (large specific capacity, up to 150 mAh/g) implies a high specific energy value (obtained by integrating the voltage curve over the specific capacity range) based on the cathode active material weight.

In addition to the intercalation of $Al^{3+}$, $AlCl_4^-$, and/or $Al_2Cl_7^-$ ions, there are CNT surface areas that are accessible to liquid electrolyte and the surfaces would become available for ion adsorption/desorption and/or surface redox reactions, leading to supercapacitor-type behaviors (electric double layer capacitance, EDLC, or redox pseudo-capacitance). This behavior is responsible for the slopping voltage curve after an initial plateau regime.

In summary, the charge or discharge of the invented cathode layer can involve several charge storage mechanisms. Not wishing to be bound by theory, but we believe that the main mechanisms at the cathode during battery charging are (1) desorption of $EMI^+$ ions from graphene surfaces, (2) de-intercalation by $Al^{3+}$ and $AlCl_4^-$ from the inter-planar spaces, and (3) desorption of $AlCl_4^-$ and $Al_2Cl_7^-$ ions from graphene sheet surfaces. At the anode, during battery charging, $Al_2Cl_7^-$ ions can react with electrons to form $AlCl_4^-$ anions and Al, wherein $AlCl_4^-$ anions move toward the cathode and Al deposits on Al foil or surface of the anode current collector. The $Al^{3+}$ ions released from the cathode may also react with electrons to form Al metal atoms that re-deposit onto Al foil surface or the surface of an anode current collector. Some $EMI^+$ ions may form electric double layers near the anode surfaces. The above processes are reversed when the battery is discharged. Different mechanisms can dominate in different regimes of the charge-discharge curves for the cathodes having different graphitic carbon materials.

Figure 3:
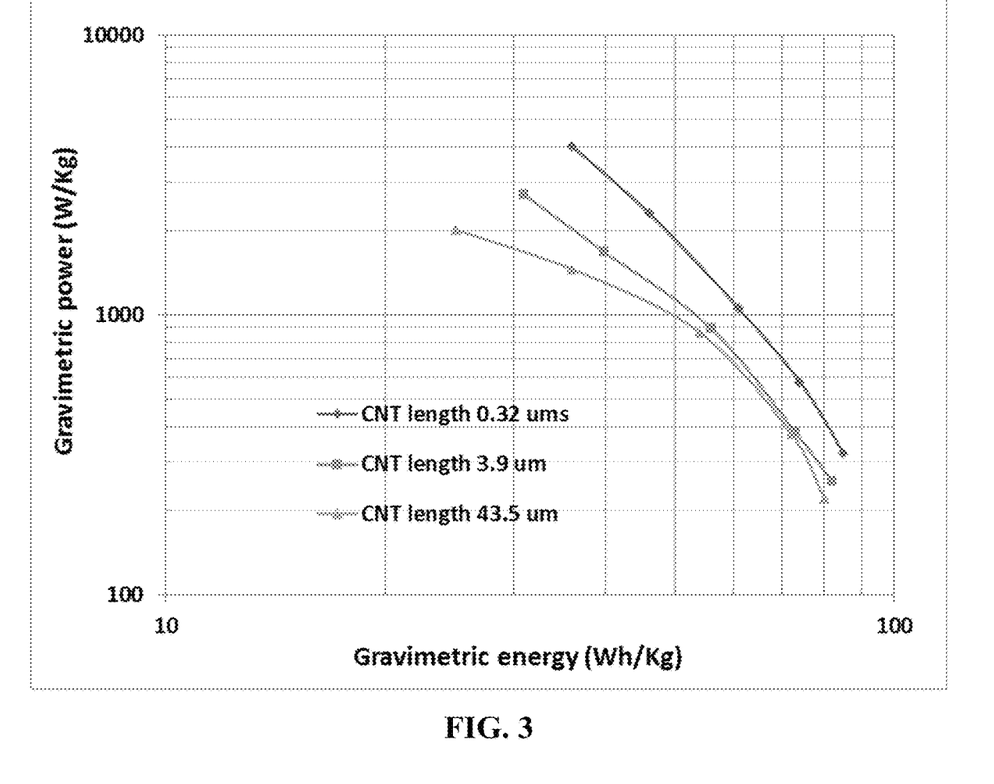
FIG. 3 The Ragone Plots for 3 aluminum cells each having a multiwalled carbon nanotube-based cathode layer, but a different average CNT length (0.32 μm, 3.9 μm, and 43.5 μm, respectively).

FIG. 3 shows the Ragone Plots for 3 aluminum cells each having a multiwalled carbon nanotube-based cathode layer, but with a different average CNT length (0.32 μm, 3.9 μm, and 43.5 μm, respectively). These data indicate that shortened CNTs are more capable of storing charges via intercalation/de-intercalation mechanisms, particularly at high charge/discharge rates.

Figure 4:
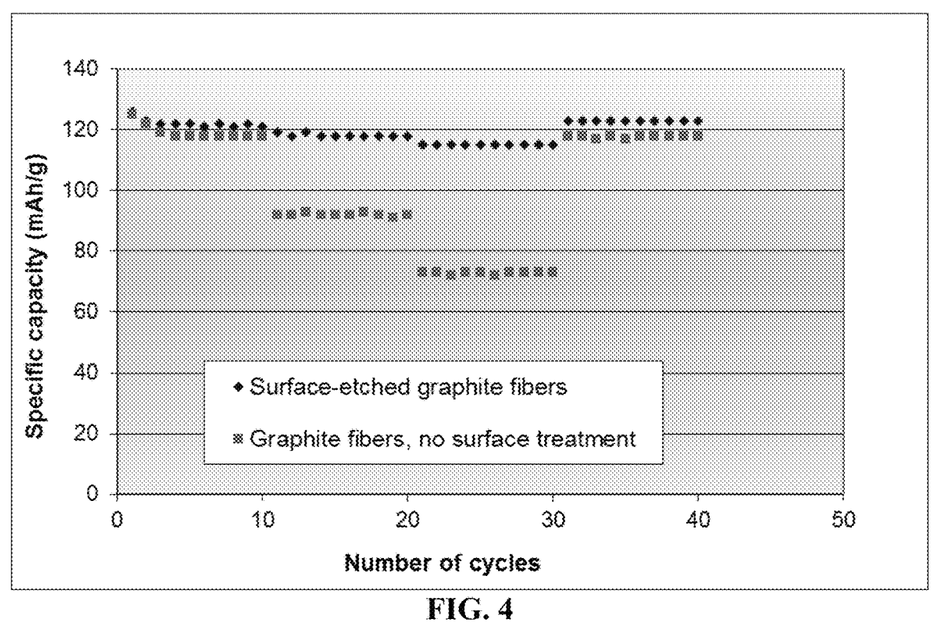
FIG. 4 The specific capacity values of two Al cells plotted as a function of charge/discharge cycles (discharge rates: 0.5 C, 3 C, 10 C, and back to 0.5 C): a cell containing a cathode layer of pitch-based graphite fibers (subjected to a surface etching treatment to remove hard carbon skin layer) and a cell containing a cathode layer of pitch-based graphite fibers (no surface etching treatment).

FIG. 4 shows the specific capacity values of two Al cells plotted as a function of charge/discharge cycles (discharge rates was varied from 0.5 C, 3 C, 10 C, and back to 0.5 C): a cell containing a cathode layer of pitch-based graphite fibers (subjected to a surface etching treatment to remove the hard carbon skin) and a cell containing a cathode layer of pitch-based graphite fibers (no surface etching treatment). These data demonstrate that the surface treatment for removing the exterior carbon skin layer imparts great high-rate capability to the battery. The cathode layer featuring surface-treated graphite fibers delivers a high specific capacity that is relatively independent of the discharge rate. In contrast, the un-treated graphite fibers appear to be less capable of delivering a high specific capacity when the rate is high. (It may be noted that 0.5 C rate means the charge or discharge is completed in 1/0.5=2 hours and 10 C rate means completion of charge or discharge in 1/10 hours, etc.).

Figure 5:
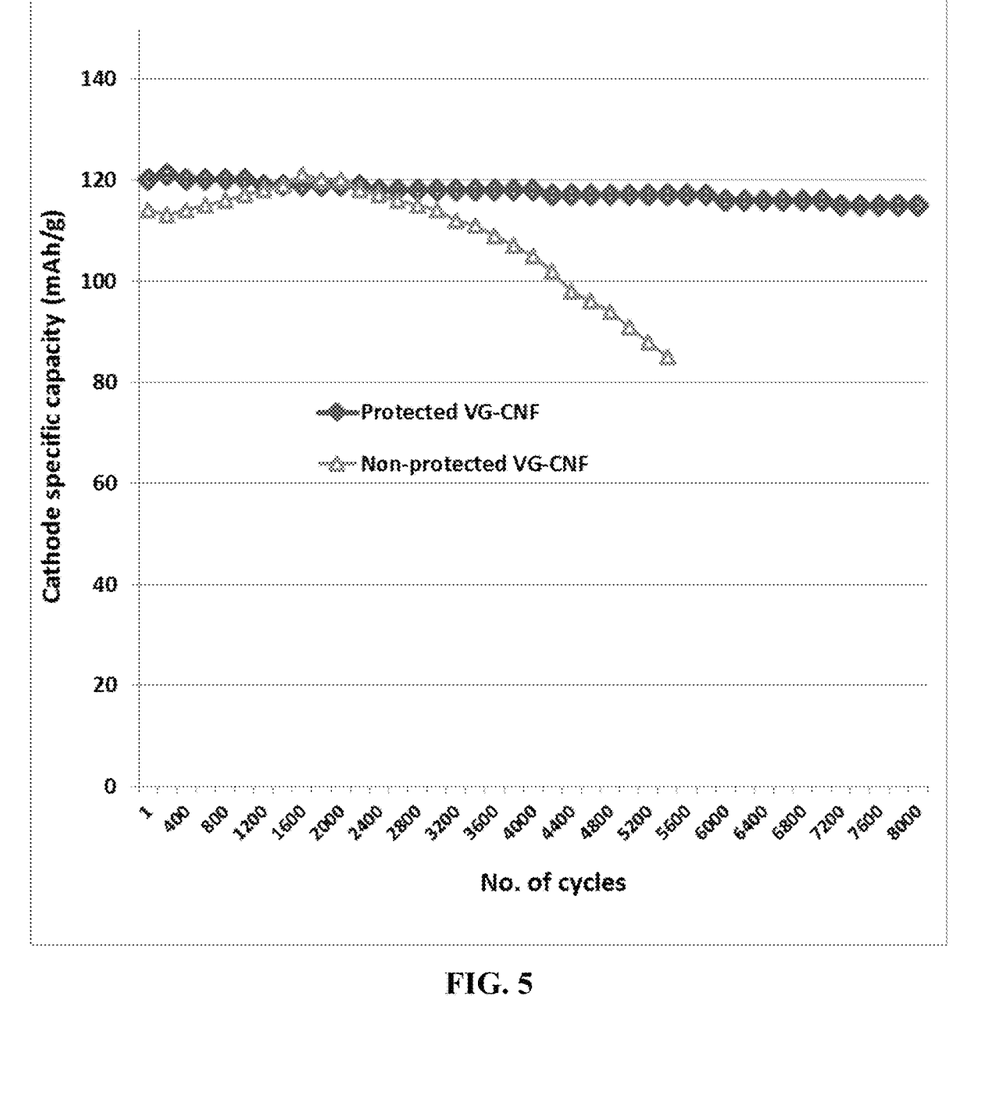
FIG. 5 The specific capacity values of two Al cells plotted as a function of charge/discharge cycles: a cell containing a cathode layer of VG-CNF (containing a surface protection layer) and a cell containing a cathode layer of VG-CNF (no surface protection layer).

FIG. 5 shows the specific capacity values of two Al cells plotted as a function of charge/discharge cycles: a cell containing a cathode layer of VG-CNF (containing a surface protection layer) and a cell containing a cathode layer of VG-CNF (no surface protection layer). This chart indicates that the cell containing VG-CNFs without a surface protection layer exhibits an initial increase in specific capacity as the number of charge/discharge cycles increases. This could be due to the initial gradual expansion of the in inter-graphene planar spaces to accommodate more ions. However, this electrochemical expansion eventually leads to exfoliation of the graphite structure (undesirably large separation between graphene planes or isolation of some graphene sheets) or even fragmentation of the nano-fibers. The structural integrity of the electrode is severely compromised. Hence, the charge storage capacity, after reaching some peak, begins to decrease rapidly due to the overall degradation of the structural integrity of the cathode layer. In contrast, the first cell containing a surface-protected VG-CNF-based cathode is capable of maintaining structural integrity for a much larger number of charge/discharge cycles.

We claim:

1. An aluminum secondary battery comprising an anode, a cathode, an optional porous separator electronically separating said anode and said cathode, and an electrolyte in ionic contact with said anode and said cathode to support reversible deposition and dissolution of aluminum at said anode, wherein said anode contains aluminum metal or an aluminum metal alloy as an anode active material and said cathode comprises a cathode active layer of graphitic carbon particles or fibers as a cathode active material that intercalates/de-intercalates aluminum ions or aluminum-containing ions, wherein said graphitic carbon particles or fibers are coated with a protective layer that is permeable to aluminum ions or ions dissolved in said electrolyte and said protective layer prevents or reduces exfoliation of graphitic planes in said graphitic carbon particles or fibers when the aluminum secondary battery is charged and discharged, wherein said protective layer contains a material selected from reduced graphene oxide, an ion-conducting polymer, an electrically conductive polymer, or a combination thereof.

2. The aluminum secondary battery of claim 1, wherein said graphitic carbon particles or fibers are selected from meso-phase carbon particles, meso carbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof.

3. The aluminum secondary battery of claim 2, wherein said meso-phase carbon particles, meso carbon micro-beads (MCMB), coke particles or needles, soft carbon particles, hard carbon particles, carbon nano-fibers, carbon fibers, graphite nano-fibers, or graphite fibers have a surface that is chemically treated to remove a layer of hard carbon or amorphous carbon therefrom.

4. The aluminum secondary battery of claim 1, wherein said graphitic carbon is selected from needle coke, carbon nano-fiber, carbon fiber, graphite nano-fiber, graphite fiber, multi-walled carbon nanotube, or a combination thereof and said graphitic carbon has a length shorter than 10 μm.

5. The aluminum secondary battery of claim 1, further comprising an anode current collector supporting said aluminum metal or aluminum metal alloy or further comprising a cathode current collector supporting said layer of graphitic carbon particles or fibers.

6. The aluminum secondary battery of claim 5, wherein said anode current collector contains an integrated nano-structure of electrically conductive nanometer-scaled filaments that are interconnected to form a porous network of electron-conducting paths comprising interconnected pores, wherein said filaments have a transverse dimension less than 500 nm.

7. The aluminum secondary battery of claim 6, wherein said filaments comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof.

8. The aluminum secondary battery of claim 1, wherein said electrolyte is selected from an aqueous electrolyte, organic electrolyte, molten salt electrolyte, ionic liquid electrolyte, or a combination thereof.

9. The aluminum secondary battery of claim 1, wherein said electrolyte contains $AlF_3$, $AlCl_3$, $AlBr_3$, $AlI_3$, $AlF_xCl_{(3-x)}$, $AlBr_xCl_{(3-x)}$, $AlI_xCl_{(3-x)}$, or a combination thereof, wherein x is from 0.01 to 2.0.

10. The aluminum secondary battery of claim 1, wherein said electrolyte contains an ionic liquid that contains an aluminum salt mixed with an organic chloride selected from n-butyl-pyridinium-chloride (BuPyCl), 1-methyl-3-ethyl-imidazolium-chloride (MEICl), 2-dimethyl-3-propylimidazolium-chloride, 1,4-dimethyl-1,2,4-triazolium chloride (DMTC), or a mixture thereof.

11. The aluminum secondary battery of claim 1, wherein the electrolyte also supports reversible intercalation and de-intercalation of ions at the cathode, wherein said ions include cations, anions, or both.

12. The aluminum secondary battery of claim 1, wherein said cathode active layer of graphitic carbon fibers operates as a cathode current collector to collect electrons during a discharge of said aluminum secondary battery and wherein said battery contains no separate or additional cathode current collector.

13. The aluminum secondary battery of claim 1, wherein said cathode active layer of graphitic carbon particles or fibers further comprises an electrically conductive binder material which bonds said graphitic carbon particles or fibers together to form a cathode electrode layer.

14. The aluminum secondary battery of claim 13, wherein said electrically conductive binder material comprises coal tar pitch, petroleum pitch, meso-phase pitch, a conducting polymer, a polymeric carbon, or a derivative thereof.

15. The aluminum secondary battery of claim 1, wherein said battery has an average discharge voltage no less than 1.5 volt and a cathode specific capacity greater than 100 mAh/g based on a total cathode active layer weight.

16. The aluminum secondary battery of claim 1, wherein said battery has an average discharge voltage no less than 1.5 volt and a cathode specific capacity greater than 150 mAh/g based on a total cathode active layer weight.

17. The aluminum secondary battery of claim 1, wherein said battery has an average discharge voltage no less than 2.0 volts and a cathode specific capacity greater than 120 mAh/g based on a total cathode active layer weight.

18. The aluminum secondary battery of claim 1, wherein said battery has an average discharge voltage no less than 2.0 volts and a cathode specific capacity greater than 150 mAh/g based on a total cathode active layer weight.

19. A method of manufacturing an aluminum secondary battery, comprising:
(a) providing an anode containing aluminum metal or an aluminum alloy;
(b) providing a cathode containing graphitic carbon particles or fibers;
(c) coating said graphitic carbon particles or fibers with a protective layer that is permeable to aluminum ions or ions dissolved in said electrolyte and said protective layer prevents or reduces exfoliation of graphitic planes in said graphitic carbon particles or fibers when the aluminum secondary battery is charged and discharged, wherein said protective layer contains a material selected from reduced graphene oxide, an ion-conducting polymer, an electrically conductive polymer, or a combination thereof; and
(d) providing a porous separator electronically separating said anode and said cathode and an electrolyte capable of supporting reversible deposition and dissolution of aluminum at the anode and reversible adsorption/desorption and/or intercalation/de-intercalation of ions at the cathode;
wherein said graphitic carbon particles or fibers are selected from meso-phase carbon particles, meso carbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof.

20. The method of claim 19, further including providing a porous network of electrically conductive nano-filaments to support said aluminum metal or aluminum alloy at the anode.

21. The method of claim 19, wherein said electrolyte contains an aqueous electrolyte, an organic electrolyte, a molten salt electrolyte, an ionic liquid, or a combination thereof.

22. The method of claim 19, wherein providing a cathode contains subjecting said graphitic carbon particles or fibers to a surface etching treatment to remove an amount of surface hard carbon from said graphitic carbon particles or fibers prior to said coating of said graphitic carbon particles or fibers.

23. The method of claim 19, wherein providing said layer of graphitic carbon particles or fibers includes applying a binder material which bonds said graphitic carbon particles or fibers together to form a cathode electrode layer.

24. The method of claim 23, wherein said binder material is an electrically conductive material selected from coal tar pitch, petroleum pitch, meso-phase pitch, a conducting polymer, a polymeric carbon, or a derivative thereof.

\* \* \* \* \*